United States Patent
De La Huerga (12)

(10) Patent No.: US 6,272,505 B1
(45) Date of Patent: Aug. 7, 2001

(54) DOCUMENT MODIFICATION BASED HYPERLINK LIMITING METHOD AND APPARATUS

(76) Inventor: Carlos De La Huerga, 9190 N. Upper River Rd., Milwaukee, WI (US) 53217

( * ) Notice: Subject to any disclaimer, the term of this patent is extended or adjusted under 35 U.S.C. 154(b) by 0 days.

(21) Appl. No.: 09/112,062

(22) Filed: Jul. 7, 1998

(51) Int. Cl.[7] ................................................. G06F 15/00
(52) U.S. Cl. .......................... 707/501; 707/500; 707/513; 707/514; 707/530; 345/333
(58) Field of Search ..................... 707/501, 513, 707/514, 530, 500; 345/333, 339, 357

(56) References Cited

U.S. PATENT DOCUMENTS

| | | | |
|---|---|---|---|
| 3,872,448 | 3/1975 | Mitchell, Jr. et al. | 340/172.5 |
| 4,817,050 | 3/1989 | Komatsu et al. | 364/900 |
| 4,893,270 | 1/1990 | Beck et al. | 364/900 |
| 4,958,283 | 9/1990 | Tawara et al. | 364/413.13 |
| 5,065,315 | 11/1991 | Garcia | 364/413.13 |
| 5,146,439 | 9/1992 | Jachmann et al. | 369/25 |
| 5,218,697 | 6/1993 | Chung | 395/650 |
| 5,253,362 | 10/1993 | Nolan et al. | 395/600 |
| 5,361,202 | 11/1994 | Doue | 364/413.01 |
| 5,377,323 | 12/1994 | Vasudevan | 395/200 |
| 5,408,655 | 4/1995 | Oren et al. | 395/600 |
| 5,459,860 | 10/1995 | Brunett et al. | 395/600 |
| 5,506,984 | 4/1996 | Miller | 395/600 |
| 5,530,852 | 6/1996 | Meske, Jr. et al. | 395/600 |
| 5,581,460 | * 12/1996 | Kotake et al. | 705/3 |
| 5,646,416 | 7/1997 | Van de Velde | 250/584 |
| 5,708,825 | * 1/1998 | Sotomayor | 707/501 |
| 5,740,252 | * 4/1998 | Minor et al. | 707/501 |
| 5,745,360 | * 4/1998 | Leone et al. | 707/513 |
| 5,754,857 | * 5/1998 | Gadol | 709/203 |
| 5,761,436 | * 6/1998 | Nielsen | 707/501 |
| 5,895,461 | * 4/1999 | De La Huerga et al. | 707/1 |
| 5,905,991 | * 5/1999 | Reynolds | 707/501 |
| 5,940,843 | * 8/1999 | Zucknovich et al. | 707/516 |
| 5,970,505 | * 10/1999 | Ebrahim | 707/501 |
| 5,987,475 | * 11/1999 | Murai | 707/200 |

OTHER PUBLICATIONS

Microsoft Corporation, Microsoft Word 97, sreen printouts, pp. 1–4,1997.*
Glinert, A pumped–up publishing pro, Apr. 1997, Competer Shopper, p. 462.*
Goodman, Web documents without HTML, Apr. 1997. Computer Shopper, p. 412.*
Marshall, Acrobat, Common Ground extend reach beyond document viewing, InfoWorld, Apr. 21, 1997, p. 105.*
Weibel, Publish to paper and the Web, Dec. 1996, PC/Computing, p. 130.*

* cited by examiner

Primary Examiner—Heather R. Herndon
Assistant Examiner—Cong-Lac Huynh
(74) Attorney, Agent, or Firm—Quarles & Brady, LLP

(57) ABSTRACT

A method for limiting movement and copying of word processing text within a single document and among documents when the text to be moved includes hyperlinks wherein the hyperlinks link to information that is document specific, processing can be limited in any of several different ways including prohibiting movement, notifying an operator and facilitating movement, notifying an operator and allowing the operator to choose movement and so on.

21 Claims, 8 Drawing Sheets

For ID # 991872

Object #87 WP Document for ID # 110182

30

... was not malignant. As is illustrated in a pre-sugery MRI image , the lower chamber had an irregularity midway between the...

O-87

... in the end, the post-surgery X-ray image 21 shows that ...

... as well as can be expected. MRI image illustrates that the surgery was a success and the patient is now doing fine ...

Figure 4

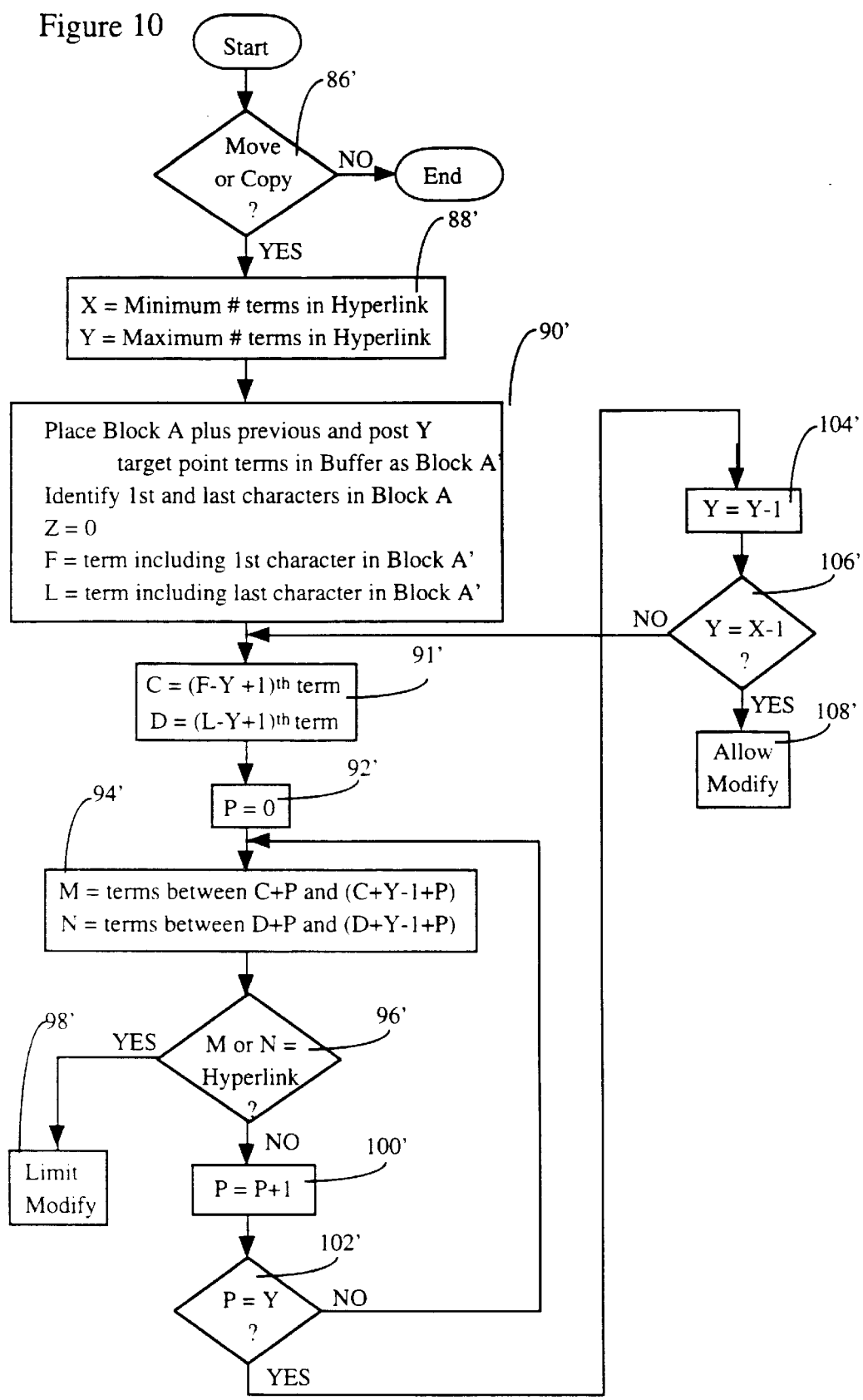

DOCUMENT MODIFICATION BASED HYPERLINK LIMITING METHOD AND APPARATUS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to word processors and more particularly to a word processor feature which limits movement, copying and deleting of word processor text within a single document and among documents where the text block to be moved, copied or deleted includes one or more hyperlinks.

Recent advances in electronic data entry and storage have rendered it extremely easy to enter, store and retrieve many different types of information. Perhaps the most common type of electronically stored information includes word processor documents which can be entered into a computer memory via any of several different commercially available word processor packages. Other types of information which are commonly electronically stored include pictures, video clips, audio clips, graphs, charts, tables and so on. For the purposes of this explanation, all types of electronically stored information will be referred to generically as information objects or simply objects. Thus, a video clip will be referred to as one object, a word processor document will be referred to as another object, etc.

To focus this explanation, this explanation will be presented in the context of a hospital environment where specific types of objects are commonly electronically stored. However, it should be understood that the present invention is not to be limited to the hospital environment, but rather, is applicable to many different environments and many different object types.

Objects are stored at specific addresses in electronic storage devices and each object can be accessed by selecting the specific address associated with the object. Because the number of stored objects associated with a computer system often becomes voluminous, object addresses are routinely referenced by long character strings which are difficult to remember and therefore are difficult to indicate to a processor when an object is to be accessed. This is particularly true where an object is stored on a computer network such as a local area network (LAN) or a wide area network (WAN) which may have several hundreds or even thousands of users, each of which can access many different objects stored on the network. Object addresses are even longer on the Internet where virtually millions of addresses are defined.

To facilitate easy retrieval of an object, most computers include an object management system which allows an object creator (i.e., a user who initially enters an object) to fashion an object specific name. For example, a video showing a portion of an open heart surgery might be accessible via the name "OPEN HEART SURGERY CLIP 1" whereas an audio tape of an irregular heart beat might be accessible via the name "IRREGULAR HEART BEAT CLIP 1". The object name is linked to the object address such that when the object name is specified, the processor correlates the name with the address, locates the desired object at the correlated address and retrieves the object for viewing and/or editing when appropriate.

Object management systems also typically include an object directory which can be accessed to view all object names and to select one or more objects from the directory for viewing. Object selection is usually carried out by using a mouse or the like to select a desired name.

Several word processor features have increased the value of word processors appreciably. Two important features include text block modifications and hyperlinks.

Text Block Modifications

Often a block of text which already exists in a first document is identical to, or nearly identical to, a text block which should be provided in a second document. In this case, instead of manually reentering the text block in the second document, a copy and paste word processor feature allows a user to select the text block in the first document, copy the selected text to a buffer, enter the second document, select an insert point within the second document where the text block should be inserted, and then dump the text block from the buffer into the insert point.

Similarly, it is often desired to move text from a first location within a single document to a second location within the same document. In this case a move and paste word processor feature allows a user to select the text block to be moved, copy the selected text to a buffer, select the location within the document where the text block should be inserted, and then dump the text block from the buffer into the insert location.

One other useful text block modification feature is the ability to select blocks of text within a document and delete whole blocks using a single key stroke.

Hyperlinks

Often several objects are related and a full understanding of information presented via a first object can best be appreciated by referring to related objects. For example, a first word processor document might describe pre-surgery details of a patient's condition and treatment, surgery and post surgery condition and treatment. Objects related to the first word processor document might include a pre-surgery MRI image, a pre-surgery X-ray image, a graph illustrating pre-surgery weight loss, a video clip illustrating a key portion of the surgery and some unexpected symptoms, a post-surgery MRI image, a post-surgery X-ray image and a graph illustrating post-surgery weight gain. The first word processor document might refer to any or all of the related objects. Preferably, each object referred to in a document should be easily accessible to fully understand what is expressed in the referring document.

One way to access a second object when the second object is referenced by a first object is to return to the object directory, identify the second object in the directory, select the second object and view the second object. While accessing an object via the object directory is possible, this solution is relatively difficult to implement and is time consuming. In addition, accessing an object directory causes relatively large gaps in a users train of thought and therefore might in fact cause confusion instead of aiding a user's understanding of the referring document.

One relatively recently developed word processor feature, the hyperlink, has made it relatively easy to access one or more objects from within a document displayed on a monitor without returning to an object directory. A typical hyperlink includes three components, a hyperlink phrase which is akin to an object name, a hyperlink address akin to an object address, and a hyperlink site.

The hyperlink phrase typically appears within other text in a word processor document which is displayed on a screen for viewing. The hyperlink phrase may be highlighted in some manner. For example, often highlighting will take the form of a bold text or a uniquely colored text (e.g. blue). A hyperlink phrase is related to a specific hyperlink site by an associated hyperlink address and usually is descriptive of the related site. For example, a hyperlink phrase "OPEN HEART SURGERY CLIP 1" might include a video clip illustrating an important portion of an open heart surgery. By selecting a specific hyperlink phrase, a user selects an associated hyperlink site and automatically displays the object stored at the selected site. Hyperlink selection is typically performed by using a mouse controlled arrow to select the hyperlink phrase.

U.S. patent application Ser. No. 08/727,293 entitled Method And System For Automated Data Storage And Retrieval With Uniform Address Scheme, which was filed by the present inventor on Oct. 9, 1996, describes one method in which hyperlinks can easily be formed within a word processor document. According to the method and system discussed therein, each document created is associated with a specific subject. For example, a hospital record is associated with a specific patient. As information is provided to a processor to create a patient record or report, the processor recognizes phrases and automatically creates hyperlinks which can thereafter be used to access objects related to the document. For example, a hyperlink phrase "PRE-SURGERY MRI IMAGE" would be recognized by the processor as a hyperlink phrase. To create the hyperlink, the processor correlates the hyperlink phrase with a pre-surgery MRI image specific to the patient for which the document is being generated. This is important because there may be many pre-surgery MRI images stored on a hospital data base but only one which is associated with the specific patient. After a hyperlink is created, whenever the patent report is observed via a monitor, an observer can select the phrase to view the associated hyperlinked object.

While each of the hyperlink, copy, move and delete features described above greatly increases word processor usefulness, when these features are used together, some peculiar and unintended results may occur. For example, assume that a physician at a medical facility performed an open heart surgery on a first patient and a procedurally identical surgery on a second patient one week later. After the first surgery the physician creates a detailed report concerning the pre-surgery, post surgery and surgery conditions and includes several hyperlink phrases associated with objects related specifically to the first patient.

After the second surgery, in order to reduce the time required to generate a report for the second patient, the physician accesses the first report and uses the copy and paste word processor feature to copy text blocks from the first patient's report into the second patient's report. In this case, in addition to copying the text block, if a hyperlink phrase is included in the text block, the hyperlink address associated with the copied hyperlink phrase is also copied.

Unfortunately, when the copied hyperlink phrase is later selected, the selected phrase accesses an object related to the first patient's surgery, not the second patient's surgery. For example, a heart video clip will show the first patient's heart, not the second patient's heart. If the physician forgets to revise the addresses with hyperlink phrases in copied text blocks to access objects related to the second patient, the second patient's report will be inaccurate and essentially unusable for future medical documentation and diagnostic purposes.

Similarly, even within a single patient's report, text block copying can result in incorrect object references. For example, a hyperlink phrase referring to a post-surgery MRI image may be copied from a first to a second section of a patient's record which discusses a pre-surgery MRI image. In this case, while the physician may edit the text block to refer to a pre instead of a post-surgery MRI image, the hyperlink will still be formed to the post-surgery MRI image. For this example, when accessed, the pre and post-surgery images are identical.

Another problem which results from facilitating both hyperlinks and copying, moving and deleting text via a word processor is that some text block copying, moving and deleting can result in unintended creation or destruction of hyperlink phrases. For example, where a hyperlink phrase exists in a document and a text block to be moved or deleted within the document includes a portion of the hyperlink phrase, when the text block is moved or deleted the hyperlink will no longer exist as the hyperlink phrase is fragmented. Similarly, after a text block is moved or copied to an insert point in a document, the beginning or ending characters of the text block together with characters just before or just after an insert point may form a new hyperlink phrase for which the processor will generate a new and unintended hyperlink.

For these reasons a need exists to provide some type of limiter to control copying and moving of text blocks including hyperlink phrases between two or more documents and within a single word processor document and to limit block deletions which include hyperlink phrases within a single document.

BRIEF SUMMARY OF THE INVENTION

The present invention includes a method and apparatus for limiting copying of text blocks which include one or more hyperlinks between two or more word processor documents and within a single word processor document. When a text block is to be copied or moved, the processor searches the block to identify any hyperlink phrases within the block. In its simplest form a hyperlink phrase is located, the processor simply does not allow copying or moving of the text block.

Generally, the invention includes a method for use with a computer having a word processor capable of allowing access to at least first and second separate word processor documents, displaying at least one of the first and second word processor documents on a screen for viewing, facilitating text block importation including both copying and moving of text blocks between the first and second documents and also facilitating formation of hyperlinks between hyperlink phrases within a displayed document and other electronically stored hyperlink information identified by hyperlink addresses, a block to be imported being an import block, the method for limiting text block importation when an import block includes hyperlink text. The method comprises the steps of monitoring word processor commands, identifying text block importation commands wherein an import block includes at least one hyperlink phrase and when an import block includes at least one hyperlink phrase, limiting the import block importation.

One object of the invention is to limit hyperlink copying and moving so that erroneous hyperlinks are not created. To this end, the processor identifies hyperlink text within a text blocks to be copied or moved and, when a text block includes a hyperlink phrase, limits movement of the text block.

In one embodiment the step of limiting includes prohibiting import block importation. In another embodiment the step of limiting includes destroying hyperlinks between any import block hyperlink phrases and hyperlink information and allowing the text block importation.

The first document may be related to a first topic and the second document may be related to a second topic. Each separately accessible segment of hyperlink information is a hyperlink object and there are first and second hyperlink object sets including specific hyperlink objects, the subject matter of the first and second sets corresponding to the first and second topics, respectively. Each hyperlink object is associated with a designating hyperlink phrase. The document to which the import block is to be provided is a receiving document. In this embodiment the step of limiting further includes the steps of destroying hyperlinks while leaving hyperlink phrases intact in the import block, identifying a receiving document object set and, for each object in the receiving document object set (i) identifying a designating hyperlink phrase, (ii) identifying each instance of the designating phrase which occurs in the import block and (iii) establishing a separate hyperlink for each designating phrase instance with an object from the import document object set generating a modified import block.

Thus, another object is to automatically form hyperlinks when a text segment from one document is moved to a second document wherein separate object sets are associated with each of the first and second documents. To this end, when a text block is to be moved, first all existing hyperlinks in the block are destroyed. Then, when the block is moved into the second document new hyperlinks associated with the second object set are automatically formed. Another way to accomplish this same end is to first allow a text block to be imported and, only after import, destroy existing hyperlinks and form new hyperlinks associated with the second document object set.

In some cases the text used to designate objects in the first set is identical to the text used to designate objects in the second set. In these cases the method further includes the steps of, prior to destroying, identifying hyperlink phrases in the import block and storing a record of the import block hyperlink phrases, and the step of identifying designating hyperlink phrases includes the step of accessing the stored import block hyperlink phrases.

In all cases hyperlink phrases have maximum and minimum numbers of terms. Thus, each designating hyperlink phrase includes at least X and no more than Y separate terms and the step of identifying each instance of the designating phrase includes the steps of, for each designating hyperlink phrase, comparing the designating hyperlink phrase to every consecutive text segment in the import block having a length of between X and Y terms and, when the designating hyperlink phrase matches the text segment, identifying the text segment as an instance of the designating phrase.

In other embodiments, when a hyperlink phrase is identified the processor indicates the existence of the hyperlink to a user and allows the user to make an independent judgement that the copying or moving should continue. To this end, the text block command generator is an operator and the step of limiting includes the steps of notifying the operator that an import block includes at least one hyperlink phrase, allowing the operator to affirmatively acknowledge that the import block including the hyperlink phrase should be imported and, if the operator chooses to import the import block, completing the import block importation.

Preferably the step of notifying includes the step of providing the operator with the choice of (1) allowing the import block importation to occur with hyperlinks intact or (2) destroying hyperlinks between any import block hyperlink phrase and hyperlink information and allowing the import block importation to occur.

The invention also includes a method for use with a computer having a word processor capable of displaying a word processor documents on a screen for viewing, facilitating text block edits including both copying and moving of text blocks within the document and also facilitating formation of hyperlinks between hyperlink phrases within the document and other electronically stored hyperlink information identified by hyperlink addresses. A block to be edited is an edit block. The method is for limiting text block edits when an edit block includes a hyperlink phrase. The method comprises the steps of monitoring word processor commands, identifying text block edit commands wherein an edit block includes at least one hyperlink phrase and when an edit block includes at least one hyperlink phrase, limiting the text block edit.

The step of limiting may include prohibiting the text block edit. Where the text block edit command generator is an operator the step of limiting may include the steps of notifying the operator that an edit block includes a hyperlink phrase, allowing the operator to affirmatively acknowledge that the edit block including a hyperlink phrase should be edited and, if the operator chooses to edit the edit block, completing the text block edit.

Preferably the step of notifying includes the step of providing the operator with the choice of (1) allowing the text block edit to occur with hyperlinks intact or (2) destroying hyperlinks between any edit block hyperlink phrases and hyperlink information and allowing the text block edit to occur.

In another embodiment the step of limiting may include destroying hyperlinks between any edit block hyperlink phrases and hyperlink information and allowing the text block edit.

The invention also includes a method for use with a computer having a word processor capable of allowing access to at least first and second separate word processor documents, displaying at least one of the first and second word processor documents on a screen for viewing and facilitating text block modification including both copying and moving of text blocks between the first and second documents and within either of the first or second documents. A text block defined by first and last designated characters and text therebetween and a text block to be modified being a modify block. The word processor also facilitating formation of hyperlinks between hyperlink phrases within a displayed document and other electronically stored hyperlink information identified by hyperlink addresses. The method for limiting text block modifications when either the first or last modify block character or the first and last modify block characters fragment a hyperlink phrase. The method comprises the steps of monitoring word processor commands, identifying text block modification commands wherein either the first or last modify block character or the first and last modify block characters fragment a hyperlink phrase and when either the first or last modify block character or the first and last modify block characters fragment a hyperlink phrase, limiting the text block modification.

Here, the step of limiting may include prohibiting text block modification. In the alternative, where the text block command generator is an operator, the step of limiting may include the steps of notifying the operator that a modify block fragments a hyperlink phrase, allowing the operator to affirmatively acknowledge that the modify block which fragments the hyperlink phrase should be modified and, if the operator chooses to modify the modify block, completing the block modification.

In all cases each hyperlink phrase includes no more than X terms. In one embodiment each modify block has a designation point within a receiving document. The X terms within the receiving document which are directly before the designation point are proceeding terms and the X terms within the receiving document which are directly after the designation point are following terms, the first X terms in a modify block are first terms and the last X terms in a modify document are last terms. In a preferred embodiment the method is also for avoiding creation of unintended new hyperlink phrases or inadvertently destroying hyperlink phrases which exist in the receiving document. To this end, the method further includes the steps of monitoring word processor commands, identifying text block modification commands wherein a completed modification would either destroy an existing hyperlink phrase by splitting the proceeding and following terms or create a new hyperlink by combining either the proceeding and first terms or combining the last and following terms and when a completed modification would either destroy an existing hyperlink phrase by splitting the proceeding and following terms or create a new hyperlink by combining either the proceeding and first terms or combining the last and following terms, limiting the text block modification.

The invention includes yet another method for use with a computer having a word processor capable of allowing access to at least first and second separate word processor documents, displaying at least one of the first and second word processor documents on a screen for viewing and facilitating text block modification including both copying and moving of text blocks between the first and second documents and within either of the first or second documents. A document receiving text is a receiving document, a text block to be modified is a modify block and each modify block has a designation point within a receiving document. The X terms within the receiving document which are directly before the designation point are proceeding terms, the X terms within the receiving document which are directly after the designation point are following terms, the first X terms in a modify block are first terms and the last X terms in a modify document are last terms. The word processor also facilitates formation of hyperlinks between hyperlink phrases within a displayed document and other electronically stored hyperlink information identified by hyperlink addresses. This method is for avoiding creation of unintended new hyperlink phrases or inadvertently destroying hyperlink phrases which exist in the receiving document. The method further includes the steps of monitoring word processor commands, identifying text block modification commands wherein a completed modification would either destroy an existing hyperlink phrase by splitting the proceeding and following terms or create a new hyperlink by combining either the proceeding and first terms or combining the last and following terms and when a completed modification would either destroy an existing hyperlink phrase by splitting the proceeding and following terms or create a new hyperlink by combining either the proceeding and first terms or combining the last and following terms, limiting the text block modification.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefor, to the claims herein for interpreting the scope of the invention.

BRIEF DESCRIPTION OF THE SEVERAL VIEWS OF THE DRAWINGS

FIG. 3 is text illustrating insertion of the text block of FIG. 2 into the second document;

FIG. 4 illustrates resulting text in the first document of FIG. 2 when the text block is removed from the first document;

FIG. 10 is a flow chart illustrating an inventive method by which, when moving or copying a text block to a document creates a new hyperlink phrase, phrase import is limited.

DETAILED DESCRIPTION OF THE INVENTION

Figure 1:
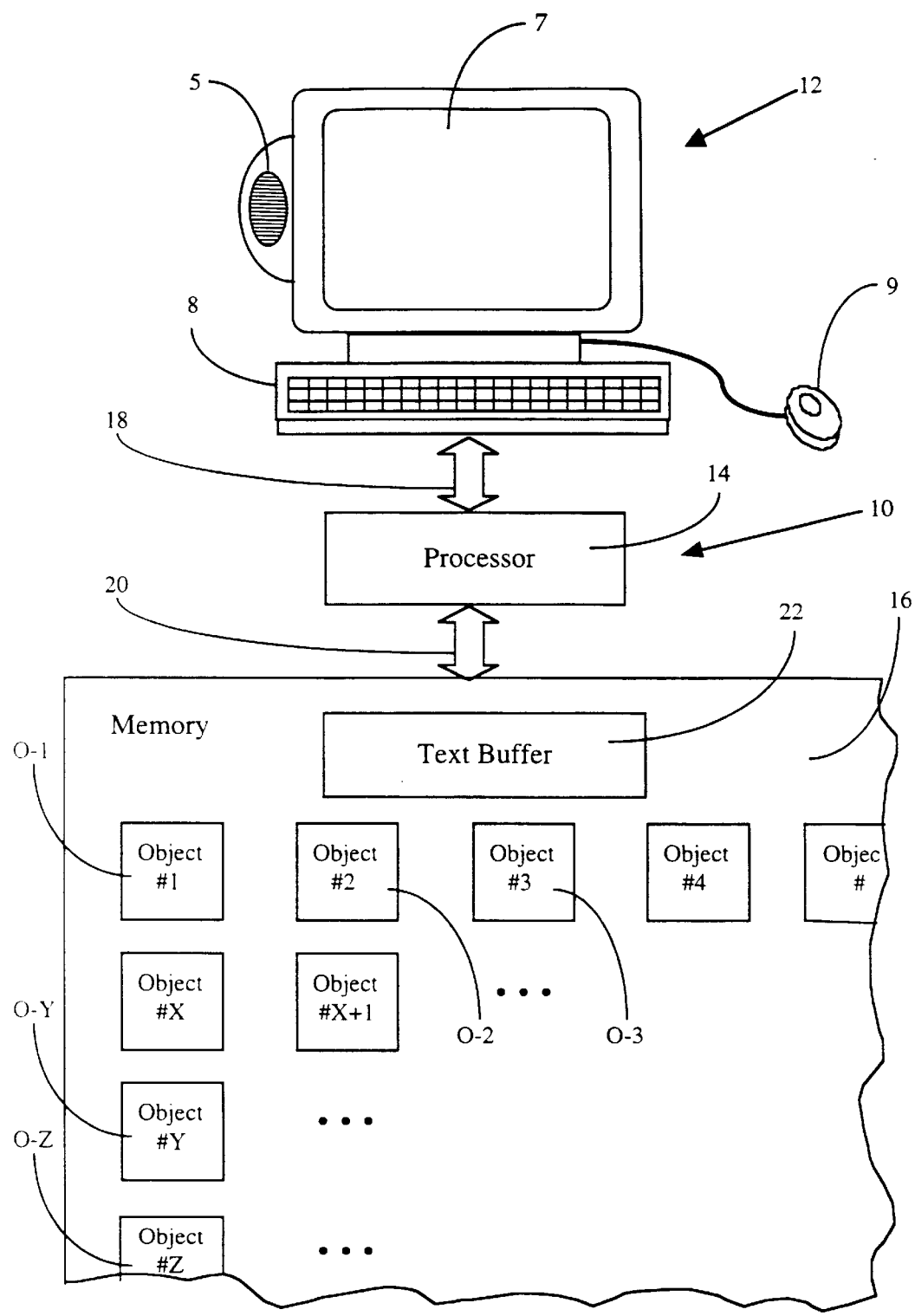
FIG. 1 is a block diagram of a computer system.

Referring now to the drawings wherein like reference characters represent corresponding elements throughout the several views, and more specifically referring to FIG. 1, the present invention will be described in the context of an exemplary computer system 10. System 10 includes an interface 12, a microprocessor 14, a memory 16 and a plurality of data busses and data lines. Interface 12 is typically a computer terminal or network terminal including at least a keyboard 8 and a mouse 9 for entering information and commands into system 10 and a monitor 7 and a speaker 5 for providing visual and audio information respectively, to a user. For the purposes of the present invention, monitor 7 is capable of displaying two or more word processor documents for viewing and editing. In addition, monitor 7 is capable of displaying high quality images and video clips for viewing.

Processor 14 can be any of several different commercially available electronic processors capable of receiving electronic information via interface 12, performing commands received by interface 12 and manipulating digital data. Interface 12 is linked to processor 14 by a two-way data buss 18.

Memory 16 can be provided in any of several different commercially available forms from any of several different memory suppliers and simply includes electronic memory space wherein digital data representing word processor documents, video clips, audio clips, graphs, charts, tables, etc. can be stored. Each separate word processor document stored in memory 16 is stored as a separate and uniquely addressable object. In FIG. 1, objects are referenced by numerals O-1, O-2, O-3, etc. Similarly, unique video clips, images, audio clips, charts, tables, graphs, etc. are stored as uniquely addressable objects within memory 16.

In addition to providing space for storage of objects O-1, O-2, etc., memory 16 also provides a text buffer 22. Buffer 22 is used when text is moved or copied from one word processor document to another or when text is moved within a single word processor document, to identify hyperlinks within the text block to be moved or copied or hyperlinks which are inadvertently created or destroyed when a text block is moved, copied, or deleted. Operation of buffer 22 will be explained in more detail below.

Processor 14 is linked to memory 16 via a two-way data bus 20 which allows processor 14 to retrieve any of objects O-1, O-2, etc. and restore the objects to memory 16 after manipulation. In addition, processor 14 can be used to create additional new objects which are thereafter stored in memory 16.

It should be noted that, although a simple computer system 10 is illustrated in FIG. 1, clearly the present invention could be used with much more complicated computer systems such as a LAN, a WAN, the Internet and so on. In fact, the advantages of the present invention become even more important as a computer system is expanded to greater sizes. This is because, with larger computer systems there are many more objects stored in memory which are accessible via a processor 14 for manipulation, viewing and storage. Systems including greater numbers of objects facilitate the creation of greater numbers of hyperlinks within word processor document text and therefore more readily lead to the problems discussed above.

Figure 2:
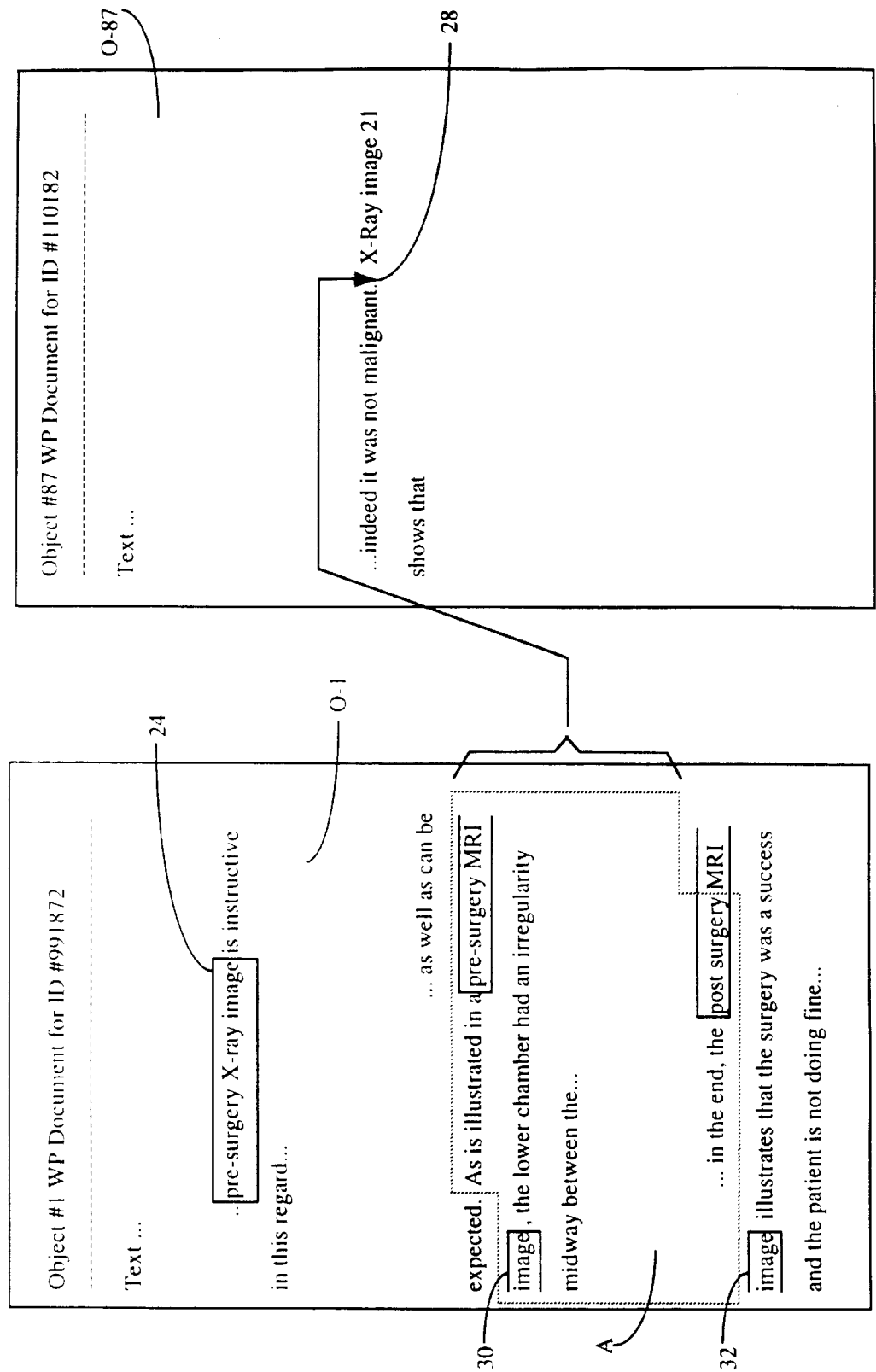
FIG. 2 is a schematic representation of two word processor document documents or objects, a text block being copied from a first of the documents to a second.

Referring now to FIG. 2, unless indicated otherwise, the inventive methods will be described in the context of a text block copy command wherein a text block including a hyperlink phrase is to be moved from one word processor document or object O-1 to a second word processor document or object O-87. In FIG. 2, object O-1 is a word processor document which describes a medical report for a particular hospital patient, the patient referenced by a hospital given identification number 991872. Object O-1 includes a text report created by a physician either manually by entry using keyboard 8 or the like or by dictation which was later transcribed.

It is assumed that, as document O-1 is entered into memory 16 via processor 14, several hyperlink phrases are entered and associated hyperlinks are created which link the hyperlink phrases to other objects in memory 16 via hyperlink addresses. While the hyperlink phrases and addresses may be created in any manner well known in the art, a preferred method is described in U.S. patent application Ser. No. 08/727,293 which is referenced above. In that application a method is described wherein, as text is entered via interface 8 and received by processor 14, processor 14 searches consecutive words to identify hyperlink phrases. When a hyperlink phrase is identified, processor 14 uses the identified phrase and an identification number of document O-1 to create a hyperlink address for identifying an object associated with the identified phrase and document O-1. In the present case the identification number is the patient identification number 991872 associated with document O-1.

Within document O-1 there may be several hyperlinks linking document O-1 to other objects (see FIG. 1). Any hyperlink phrase within document O-1 can be selected by a person viewing document O-1 via monitor 7. As well known in the art, selection of a hyperlink phrase can most easily be accomplished by using mouse 9 to place a cursor or arrow on the hyperlink phrase and clicking mouse 9 either once or twice.

When a hyperlink phrase is selected, processor 14 correlates the hyperlink phrase selected with an address corresponding to the appropriate object in memory 16. After correlation of the hyperlink phrase and object address, processor 14 accesses the appropriate object and displays the object via monitor 7. For example, one hyperlink phrase in document O-1 is PRE-SURGERY X-RAY IMAGE 24. When hyperlink 24 is selected by a user, processor 14 correlates hyperlink 24 with a specific object address within memory 16 at which the pre-surgery X-ray image for the patient identified by identification number 991872 is stored. Thereafter, processor 14 retrieves the pre-surgery X-ray image associated with hyperlink 24 and displays the image via monitor 7. Display of the image can be accomplished in any of several different ways. For example, the image may be displayed on the entire monitor 7 screen. In the alternative, the image may be displayed in a small image window while a larger window displays document O-1.

Referring still to FIGS. 1 and 2, document O-87 includes a medical report for a patient identified by identification number 110182. For the purposes of this explanation it will be assumed that the medical report represented by document O-87 is quite different than the report represented by document O-1. However, because some of the procedure performed on the patient identified by number 110182 is identical to the procedure performed on the patient identified by identification number 991872 and some of the symptoms and results are also identical, when creating or editing document O-87, in order to save time, a physician decides to copy a text block from document O-1 to document O-87. The text block to be copied or "imported" from document O-1 to document O-87 is identified generally by letter A. The point within the text of document O-87 at which block 26 is to be inserted is illustrated in FIG. 2 and identified by insert point 28. Thus, prior to import, the original text of document O-87 before and after insert point 28 reads " . . . was not malignant. X-ray image 21 shows that . . . "

Referring still to FIG. 2, block A begins with the words "As is illustrated . . . " and ends with the words " . . . the post surgery". In addition, block A includes one complete hyperlink referenced by the hyperlink phrase PRE-SURGERY MRI IMAGE. Moreover, block A also includes only part of a second hyperlink phrase. The second hyperlink phrase is POST SURGERY MRI IMAGE 32 and the part of the second hyperlink phrase included in block A is "post surgery".

Referring now to FIGS. 2 and 3, assuming block A is copied to insert point 28 without any limitation, the text of FIG. 3 would result in document O-87. Two results occur which are probably unintended. First, the PRE-SURGERY MRI IMAGE hyperlink 30 has been copied from document O-1 to document O-87. Hyperlink 30 is still correlated with identification number 991872. Therefore, if hyperlink 30 is selected within document O-87, processor 14 (see FIG. 1) accesses the object within memory 16 which includes the pre-surgery MRI image for the patient identified by identification number 991872 instead of accessing the pre-surgery MRI image for the patient identified by number 110182. This is an error and, at the very least, results in confusion. Moreover, if not detected, this type of error could result in erroneous diagnoses or prescription for the patient identified by number 110182.

Second, when the hyperlink fragment (i.e. POST SURGERY) at the end of block A is copied into document O-87 at point 28, the words "POST SURGERY" are followed by the words "X-ray image". While this may not be a problem in many word processors, if the word processor software run by processor 14 automatically compiles and correlates hyperlinks with objects within memory 16, although unintended, a new hyperlink corresponding to the hyperlink phrase POST SURGERY X-RAY IMAGE may be formed by processor 14. While such a new hyperlink may have been intended, it is also possible the new link was unintended and therefore erroneous.

Other problems can occur when a text block is either deleted from a document or is moved from one location in a document to another. For example, referring to FIGS. 2 and 4, if block A is deleted from document O-1 or is moved within document O-1 from its original location, the text of FIG. 4 results. As can be seen, hyperlink phrase PRE-SURGERY MRI IMAGE has been removed. This modification is probably intended as the text related to phrase 30 has been removed. However, because the first part of the hyperlink phrase (i.e. "post surgery") at the end of block A has been removed, only a fragment (i.e. MRI IMAGE) of hyperlink phrase 32 remains. Therefore, the hyperlink associated with hyperlink phrase 32 has been delinked. While such delinking may have been intended, the delinking may in fact have not been intended as much of the text related to hyperlink phrase 32 remains unaltered within document O-1. Referring specifically to FIG. 4, the pertinent text still reads "MRI Image illustrates that the surgery was a success and the patient is now doing fine . . . ". While this syntax is incorrect, the error may be difficult to identify when reading the report.

The present invention overcomes the problems with copying, moving, and deleting text blocks including hyperlinks or portions thereof within and among word processor documents. To this end, each time a text block is to be deleted, moved, or copied, processor 14 first copies the text block into buffer 22 and then analyzes the text block to identify a number of different things. First, processor 14 analyzes the text block to determine if hyperlink phrases exist within the text block. Where at least one hyperlink phrase does exist within the examined text block, processor 14 limits a users ability to move, delete or copy the text block. Second, where a command includes either moving or deleting a text block, processor 14 determines if the text block includes a part of a hyperlink and, where a text block includes a part of a hyperlink phrase, processor 14 again limits movement or deletion. Third, where a text block is to be moved or copied to a new location within any document, processor 14 determines whether or not new hyperlinks will be formed the copying or moving and, if new hyperlinks will be formed, limits the copying or moving.

Figure 5:
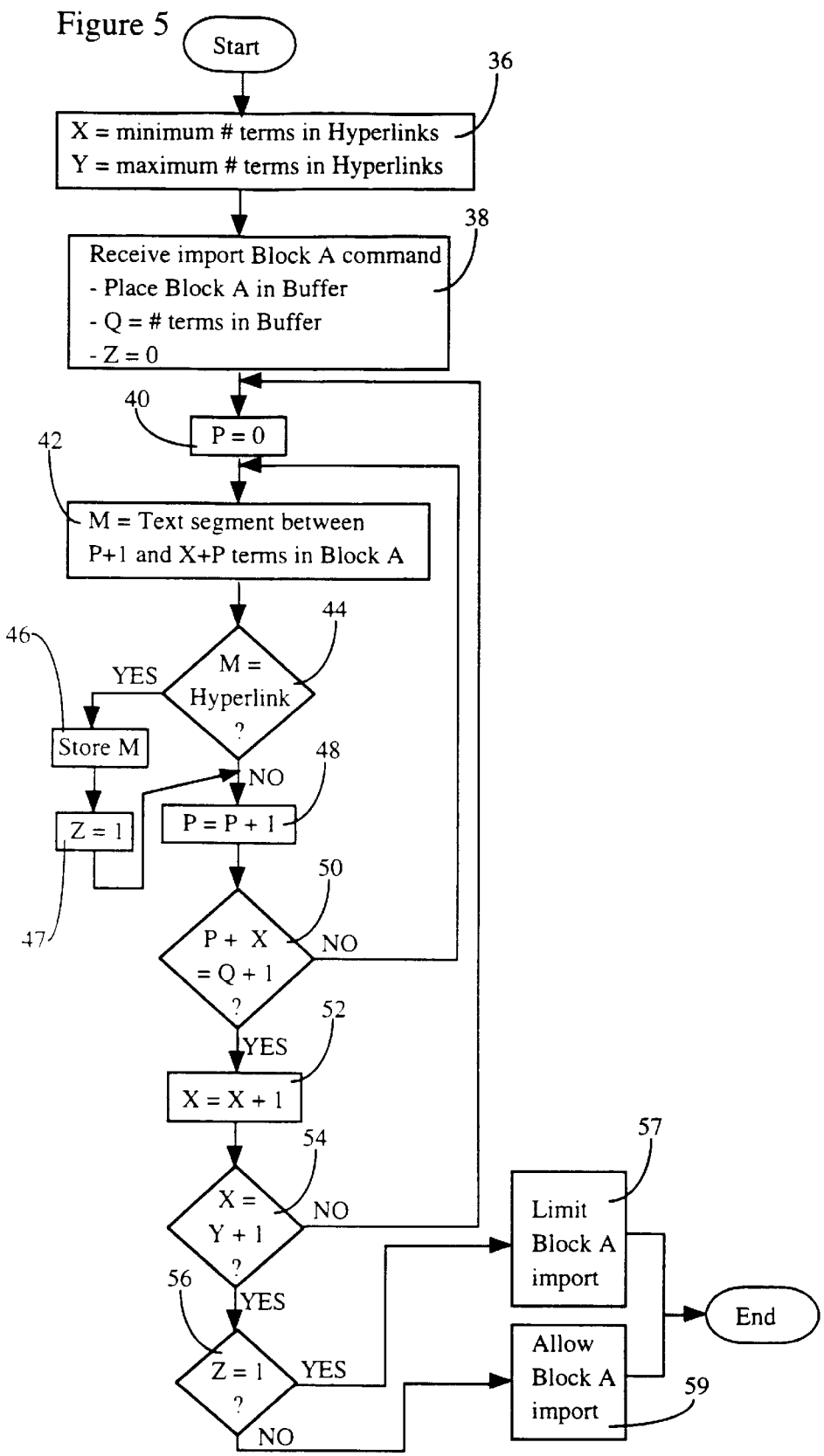
FIG. 5 is a flow chart illustrating an inventive method by which a text block to be copied or moved into a document is searched to identify hyperlink phrases within the text and limit the copying or moving.

To these ends, referring now to FIG. 5, a method for determining when a text block includes a hyperlink is illustrated. Referring also to FIGS. 1 and 2, at process block 36 processor 14 first sets two variables X and Y equal to the minimum number of terms in any hyperlink and the maximum number of terms in any hyperlink, respectively.

Next, at block 38 processor 14 receives a command from interface 12 to copy block A from document O-1 to document O-87. After the import command is received, processor 14 places block A in buffer 22. Next, processor 14 determines the total number of terms in block A, each term being a word in block A. Processor 14 sets a variable Q equal to the total number of terms in block A. Processor 14 also sets a variable Z equal to zero.

Continuing, at block 40, processor 14 sets another variable P equal to zero. At block 42 processor 14 sets a variable M equal to a text segment including the first X terms in block A. To this end, variable M is set equal to the text segment between the $(P+1)_{th}$ and the $(X+P)_{th}$ terms in block A.

At decision block 44, text segment M is compared to each possible hyperlink phrase to determine whether or not text segment M is a hyperlink phrase. Where text segment M is a hyperlink phrase, control of processor 14 passes to block 46 where a text segment M is stored as a hyperlink phrase. Next, at block 47 processor 14 sets variable Z equal to 1 indicating that at least one hyperlink phrase was identified in block A. Control passes to block 48.

Where text segment M is not a hyperlink phrase, processor 14 control passes through a loop including blocks 48 and 50 which corporate with blocks 42 and 44 to determine if any X consecutive terms within block A constitute a hyperlink phrase. To this end, block 48 increments variable P by 1 and then decision block 50 compares the sum of (P+X) to variable (Q+1). Where the sum (P+X) is not equal to variable (Q+1) all possible X consecutive terms in block A have not been compared to the possible hyperlinks at block 44. In this case, control passes back to process block 42 and through block 44 and so on. Where the sum (P+X) is equal to variable (Q+1), all possible X consecutive terms within block A have been compared to the hyperlinks at block 44 and control passes to process block 52.

Blocks 52 and 54 cooperate to increase the length of the text segments which are compared to hyperlink phrases at decision block 44. To this end, at block 52 variable X is incremented by 1. At block 54, variable X is compared to variable (Y+1), variable (Y+1) indicating when variable X has exceed the maximum number of terms in any hyperlink phrase. When X is not equal to variable (Y+1) control passes to block 40 where variable P is again set to zero and control continues to loop through blocks 40, 42, 44, 50, 52 and 54 until either a hyperlink phrase is identified in block A or variable X is equal to variable (Y+1). When variable X is equal to variable (Y+1) at block 54, control passes to block 56.

At block 56 processor 14 determines if variable Z is zero or one. If variable Z is one indicating that at least one hyperlink phrase was identified in block A, control passes to block 57 where block A import is limited in any of several different ways as indicated below. If variable Z is zero indicating that no hyperlinks were identified in block A, control passes to block 59 where block A import is allowed.

Specifically, referring again to FIGS. 1, 2 and 5, assuming block A is to be moved to point 28, in assuming that the minimum number of terms in a hyperlink is 3 and the maximum number of terms in a hyperlink is 5 and assuming that the number of terms in block A is 100, initially, at block 36, X is set equal to 3 and Y is set equal to 5. At block 38 text block A is placed in buffer 22, Q is set equal to 100, the total number of terms in block A, and Z is set equal to zero. Continuing, at block 40 variable P is set equal to zero. At block 42, variable M is set equal to the text segment between $(P-1)_{th}$ and $(X+P)_{th}$ terms in block A. Thus, because X is initially 3 and P is initially zero, text segment M is set equal to the phrase "as is illustrated".

At block 44, text phrase M (i.e. "as is illustrated") is compared to each and every hyperlink phrase possibility. Because the phrase "as is illustrated" is not a hyperlink phrase, control passes to block 48 where variable P is incremented by 1 and then passes to block 50 where the sum (P+X) is compared to variable (Q+1). At this point the sum (P+X) is equal to 4 and variable (Q+1) is equal to 101. Thus, control passes back up to block 42 where text segment M is set equal to the text segment between the second and fourth terms in block A (i.e. (P+1)=2 and (X+P)=4). In this case, text segment M is set equal to the phrase "is illustrated in". Again, at block 44 text segment M is compared to each and every possible hyperlink phrase and, because text segment M is not identical to a hyperlink phrase, control again passes to block 48. This process continues until all possible combinations of 3 consecutive terms in block A have been compared to all possible hyperlinks at block 44. Because no 3 consecutive terms in block A are identical to a hyperlink phrase in the present example, eventually control passes to block 52 where variable X is incremented by 1 (i.e. X=4). Next, at block 54 variable X is compared to Y+1(i.e. 6). Because 4 is not equal to 6, control again passes to block 40 where variable P is set equal to zero.

At block 42 text segment M is set equal to the phrase comprising the first four terms of block A. Next, at block 44 text segment M is compared to each and every hyperlink possible. Because segment M is not equal to a hyperlink control again passes block 48 and 50 and loops through those blocks until hyperlink 30 is reached. At block 44, when hyperlink 30 is compared to all of the hyperlink phrases, processor 14 identifies phrase 30 as a hyperlink phrase. At this point, control passes to block 46 and segment M is stored. At block 47 Z is set equal to one indicating that a hyperlink phrase was identified in block A and control passes to block 48. Each next time a hyperlink phrase is identified in block A, the phrase is stored at block 46. Eventually every possible text segment within block A which may be a hyperlink phrase is identified and stored at block 46. Thereafter, control passes from block 54 to block 56. In the present example, because Z=1 (i.e. a hyperlink phrase was identified), control passes to block 57 where import is limited.

Figure 6:
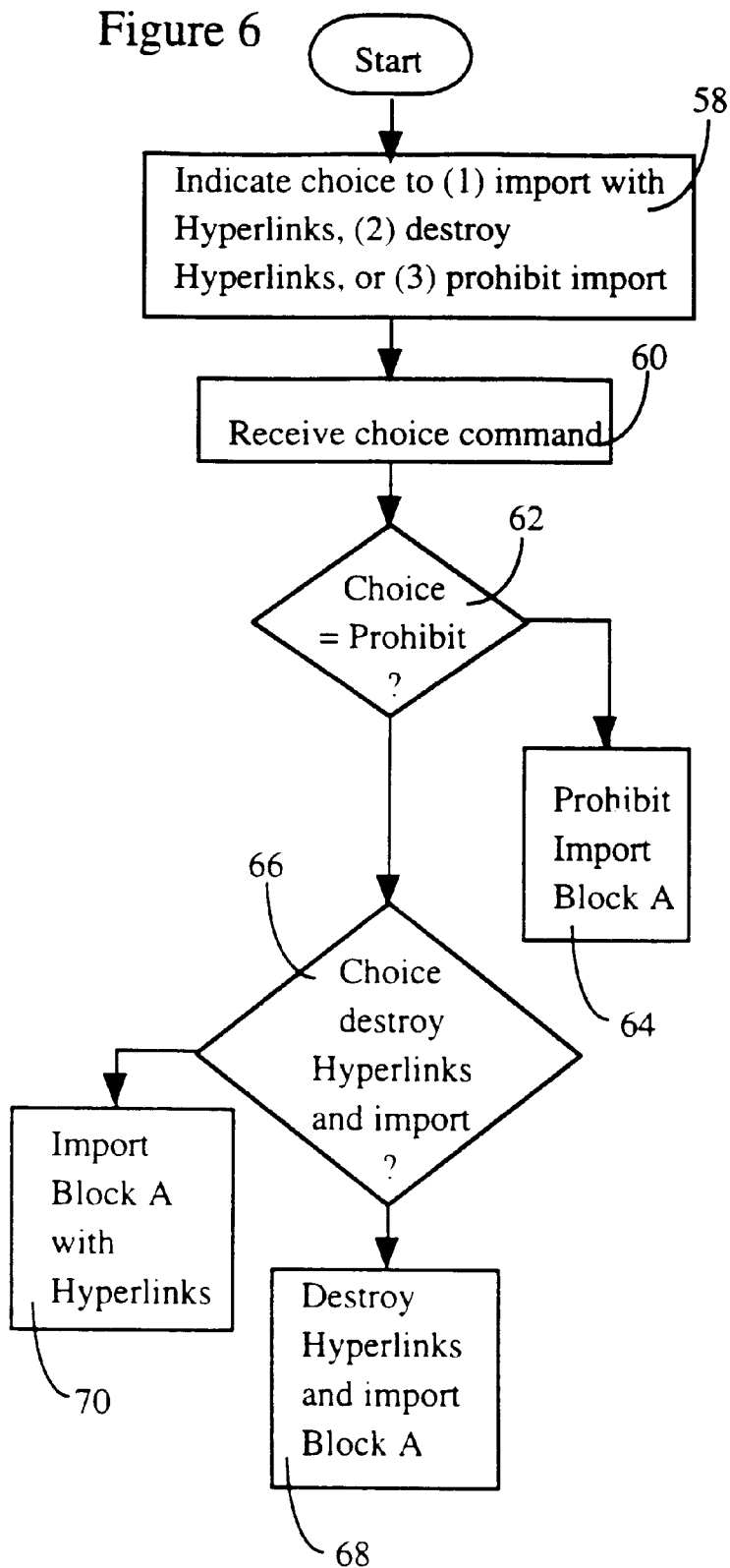
FIG. 6 is a flow chart illustrating an inventive method by which, after a hyperlink phrase is identified within a text block, a system user is provided three separate choices as to how to treat the hyperlink phrase.

Referring now to FIG. 6, one preferred method for limiting import of block A is illustrated. At block 58 processor 14 indicates via monitor 7 that a hyperlink exists within the text block A to be copied to document O-87 and, indicates the specific hyperlink phrase. In addition, processor 14 provides 3 different courses of action for the user to chose from. In particular, processor 14 allows a user to chose either to (1) import text block A with the specific hyperlink intact, (2) destroy the hyperlink and import the text block A, or (3) prohibit importation of text block A into document O-87. The user can use the interface keyboard or mouse to select any of the 3 possible choices for the specific hyperlink phrase. Therefore, the method of FIG. 6 can again be facilitated with respect to each identified hyperlink phrase.

At block 60 processor 14 receives the user's choice. At block 62 processor 14 determines if the received choice is to prohibit import. If the choice is to prohibit import, control passes to block 64 where import is prohibited. If the choice is not to prohibit import, control passes to block 66. At block 66 processor 14 determines if the choice is to destroy the specific link and import and if the choice is to destroy the link and import, control passes to block 68 where the link is destroyed without removing the hyperlink phrase and import into document O-87 is allowed. Where the choice is not to destroy the link, control passes to block 70 where import is allowed with the link intact.

Figure 7:
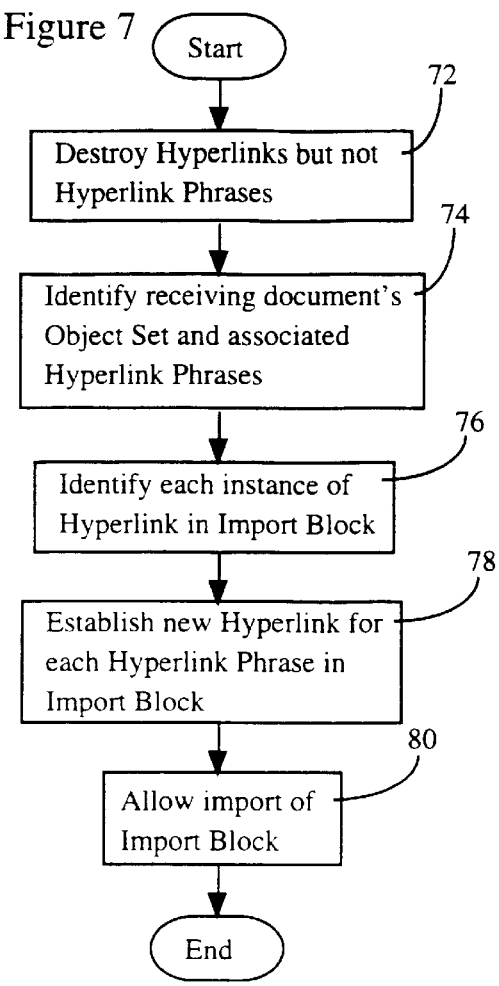
FIG. 7 is a flow chart illustrating one method by which import of a text blocking including one or more hyperlink phrases is limited.

Referring now to FIG. 7, a second method by which text block import is limited is illustrated. Referring also to FIGS. 1 and 2, at process block 72 all hyperlinks within the text block A are destroyed but the hyperlink phrases are not destroyed. At block 74 processor 14 identifies a set of objects and their associated hyperlink phrases which correspond to identification number 110182 (i.e. the identification number for the patient associated with document O-87). At block 76, processor 14 steps through the text of block A to identify all instances of hyperlink phrases in block A. This can be done in any of several different ways but, preferable is done in a manner similar to that outline in FIG. 5 above for identifying hyperlink phrases in the text to be copied. Once all hyperlink phrases within block A have been identified, at block 78 processor 14 establishes new hyperlinks for each phrase in block A. To this end, processor 14 correlates each hyperlink phrase with the address of an object in memory 16 which is associated with both the phrase and the patient identification number 110182. After new hyperlinks have been established, at block 80 processor 14 allows import of block A into document O-87.

Figure 8:
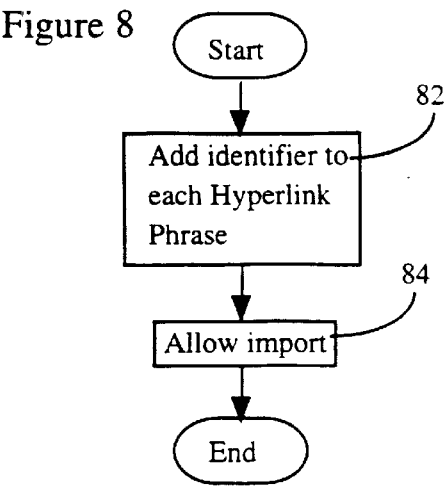
FIG. 8 is a flow chart illustrating a second method by which import of a text block including one or more hyperlink phrases is limited.

Referring now to FIG. 8 a third method for limiting block importation when at least one hyperlink exist within block A is illustrated. Referring also to FIGS. 1 and 2, after a hyperlink phrase is identified in text block A, at process block 82 an identifier is added to the hyperlink phrase to identify the patient associated with the object identified by the hyperlink phrase. For example, where block 26 is to be moved from document O-1 to document O-87, when hyperlink phrase PRE-SURGERY MRI IMAGE is identified (see block 44 in FIG. 5), an identifier such as the patient ID number which corresponds to document O-1 (i.e. identification number 991872) is added to the hyperlink phrase. In this case, the hyperlink phrase would read PRE-SURGERY MRI IMAGE ID NUMBER 991872. In the alternative, some other more descriptive identifier such as a patients name which is associated with ID number 991872 could be added to the hyperlink phrase. For example, the hyperlink phrase may be modified to read PRE-SURGERY MRI IMAGE FOR JOHN JONES. Next, at block 84 import of block A is allowed. It should be appreciated that, later, upon perusal of document O-87, any reader of that document should be able to recognize that either the identification number or the name (i.e. John Jones) associated with the hyperlink is different than the identification number or patient's name associated with document O-87.

Figure 9:
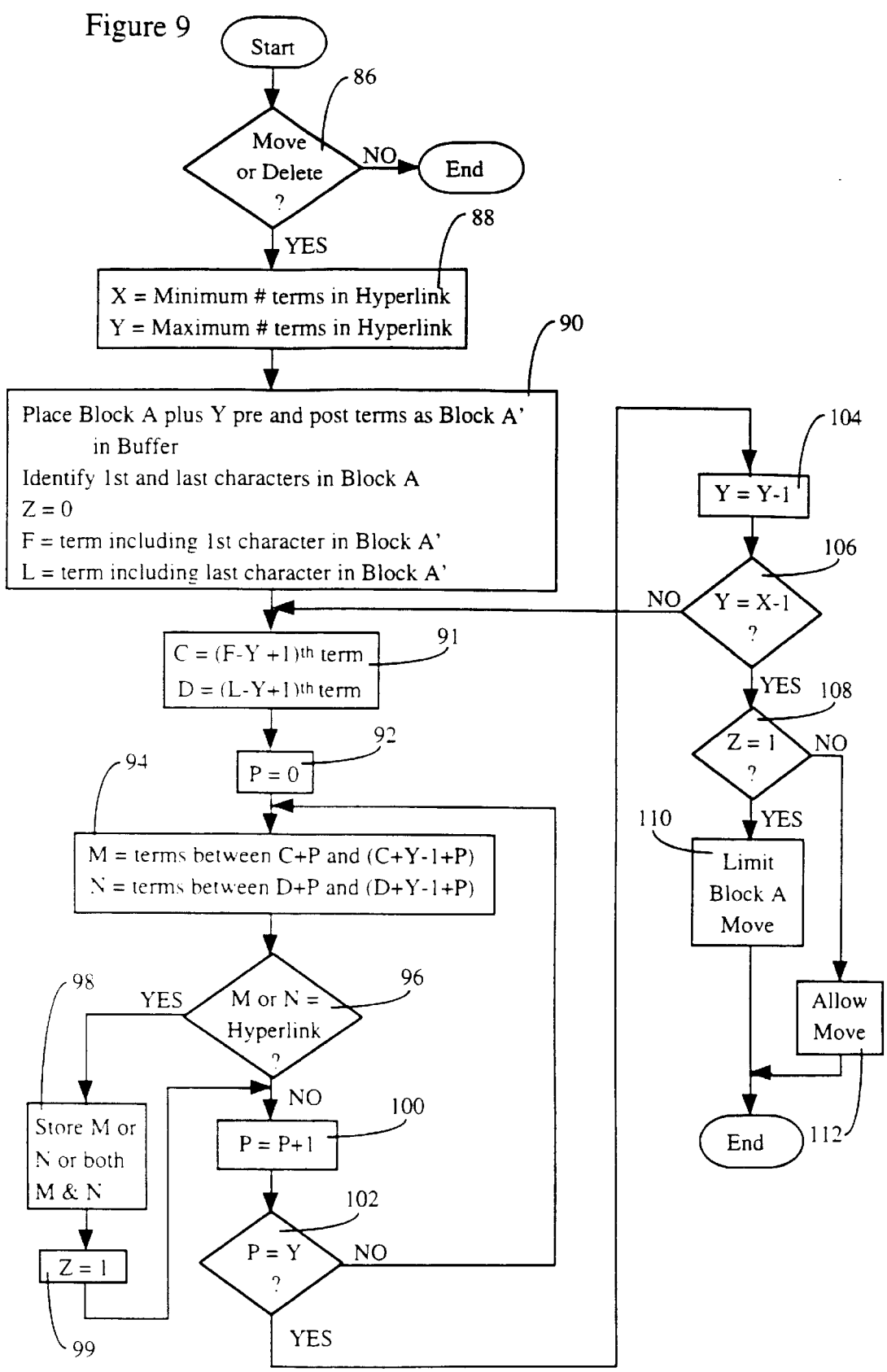
FIG. 9 is a flow chart illustrating an inventive method by which, when moving or deleting a text block from a document destroys an existing hyperlink phrase within a document, moving or deleting is limited.

Referring now to FIG. 9, a method for determining when a text block move or delete command will destroy an existing hyperlink phrase is illustrated. Where a received command is not a move or delete command the method of FIG. 9 ends. However, where the command is either a move or delete command, control passes to process block 88. For the purposes of this explanation it will be assumed that the received command is a move command to move text block A from document O-1 to document O-87.

At block 88, variables X and Y are set equal to the minimum number of terms in a hyperlink and a maximum number of terms in a hyperlink, respectively. Next, at block 90 a number of processes take place. First, block A along with terms before and after block A in document O-1 are placed in buffer 22 as a text block A'. Specifically, block A and the previous Y terms and post Y terms are placed in buffer 22 as block A'. Next, processor 14 identifies the first and last characters in block A. Processor sets a variable Z equal to zero. Then processor 14 sets a variable F equal to the term including the first character in block A' and sets a variable L equal to the term including the last character in block A'. Finally, in process block 90, processor 14 sets variable C equal to the $(F-Y+1)_{th}$ term in block A' and sets a variable D equal to the $(L-Y+1)_{th}$ term in block A'.

Figure 11:
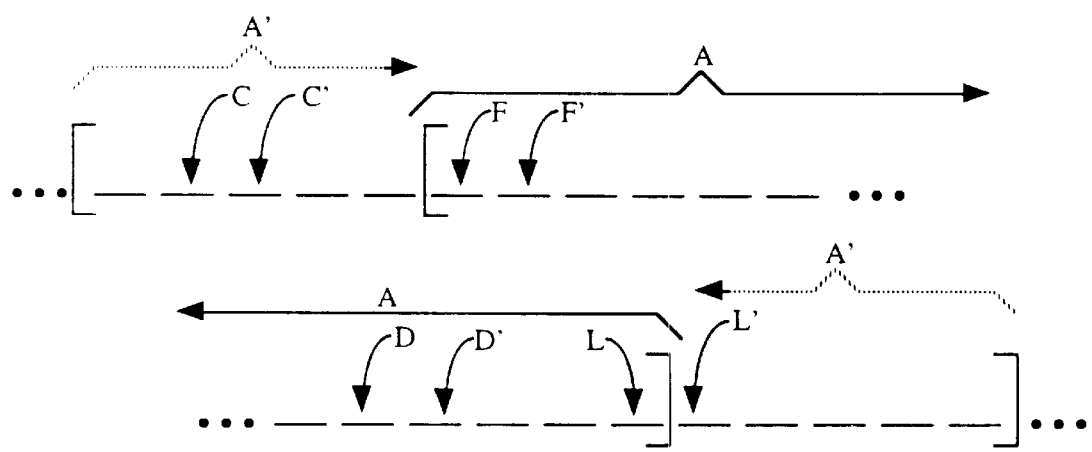
FIG. 11 is a schematic illustrating text blocks formed by a processor to carry out the inventive methods.

Referring also to FIG. 11, assuming a maximum number of terms in a hyperlink of 5, blocks A and A' are illustrated. In addition, terms F and L and initial terms C and D are illustrated. As can be seen, term F is the first term in block A and term L is the last term in block A. Initial, term C is four terms in front of term F (i.e. F−Y+1) while term D is for four terms in front of last term L.

Referring still to FIGS. 1, 2 and 9, at process block 92, a variable P is set equal to zero. At process block 94 text segment M is set equal to the phrase including terms between the $(C+P)_{th}$ and the $(C+Y-1+P)_{th}$ terms. In this case, initially, text segment M is set equal to the phrase including terms C and F and terms there between. In addition, at block 94 a text segment N is set equal to the phrase including the text segment between the $(D+P)_{th}$ and $(D+Y-1+P)_{th}$ terms. In FIG. 11 text segment N is initially set equal to the terms D and L and terms there between.

At block 96 processor 14 determines whether or not text segments M or N are identical to any of the possible hyperlink phrases. Where either segment M or N is equal to a hyperlink phrase, control passes to block 98 where the hyperlink phrase M or N or both M and N are stored. Then, at block 99 variable Z is set equal to one indicating a hyperlink has been identified. Control passes to block 100. Where neither segment M nor segment N is identical to a hyperlink, control passes to block 100.

Blocks 100 and 102 corporate to test each unique phrase including Y terms which may have been split by selecting block A to determine if any of those unique phrases are hyperlink phrases. Thus, while the first time through blocks 94 and 96 determines whether or not the text segments between terms C and F and terms D and L are hyperlink phrases, the next time through, blocks 94 and 96 should corporate to determine whether or not the segments between C' and F' and D' and L' constitute hyperlink phrases.

To this end, at block 100 variable P is incremented by 1 and at block 102 variable P is compared to Y (i.e. the maximum number of terms in a hyperlink). Where P is not equal to Y controls passes back up to process block 94. This indicates that there are still text segments having Y terms which must be compared to possible hyperlink phrases which may have been split by defining text block A. Eventually, variable P will be equal to Y and control passed to block 104 where processor 14 decrements Y by 1. In the present example, where Y was initially 5, the first time through block 104 Y will be set equal to 4.

Next, at decision block 106 processor 14 compares variable Y (i.e. 4 in the present example} to X−1 (i.e. two in the present example). The first time through block 106, Y is not equal to X−1 and therefore controls passes to block 91 where new C and D terms are identified as a function of the new decremented value Y (i.e. in this case 4). This time through blocks 91, 92, 94, 96, 100 and 102 processor 14 compares every consecutive four terms in block A' which may have been split by selecting block A. After every four term segment has been checked against each and every hyperlink phrase, at process block 104 Y is again decremented by one and at block 106 Y is compared to X−1. In this case, after the second time through the process of FIG. 9 Y is 3 and X−1 is 2 and therefore control again passes to block 91 where new C and D text segments are identified.

The next time through blocks 91, 92, 94, 96, 100 and 102 processor 14 compares every 3 consecutive term phrase in text block A' which might have been split by selecting block A to each and every possible hyperlink phrase. Again, at block 104 variable Y is decremented and a block 106 variable Y is compared to X−1. At this point, Y is equal to 2 and therefore equals X−1 (i.e. X is 3). Therefore, control passes to block 108.

At block 108, processor 14 determines if variable Z is one or zero. If variable is one indicating that at least one hyperlink phrase was identified at block 46, control passes to block 110 where the block A move is limited in some manner. However, if variable Z is zero indicating that no hyperlinks were identified at block 96, control passes to block 112 where the block A move is allowed.

Referring now to FIG. 10, FIG. 10 illustrates a method by which processor 14 can determine whether or not inserting a text block via a move or copy command will create a new hyperlink by combining text from the block being moved and text either before or after an insert point. This process is similar to the process described in detail with respect to FIG. 9 above and therefore, not surprisingly, FIG. 10 resembles FIG. 9 with a few minor exceptions. For this reason, blocks in FIG. 10 which preform similar or identical functions to blocks of FIG. 9 are identified by identical numbers followed by a "'".

The differences between FIGS. 9 and 10 are as follows. First, at decision block 86', instead of determining whether or not a command signal is a move or delete signal, processor 14 determines whether or not the command signal is a move or copy signal. If the command signal is not a move or copy signal the FIG. 10 method ends. However, the command signal is a move or copy signal, control passes to block 88'. Block 88' operates in identical faction to block 88 of FIG. 9.

With respect to block 90' the text block A' formed by processor 14 is different than the text block A' formed by the processor 14 in FIG. 9. To this end, processor 14 forms block A' by placing block A plus Y previous and Y post insert point terms in buffer 22. Again, where Y is 5, referring also to document O-87 of FIG. 2, processor 14 would place the five terms prior to insert point 28 (i.e. "indeed it was not malignant") and the five terms after insert point 28 (i.e. "X-ray image 21 shows that") and block A in buffer 22. The other processes of block 90' are identical to the processes in block 90 of FIG. 9. All of the other blocks (i.e. 91', 92', 94', 96', 98', 100', 102', 104', 106' and 108') operate in the same manner described above and should be understood from the description above.

Thus, it should be appreciate that a simple method has been described for eliminating the possibility of inadvertently providing an incorrect hyperlink in text which is copied or moved from one word processor document to another and which eliminates the possibility of inadvertently destroying a hyperlink phrase within a document or forming an unintended hyperlink phrase within a document receiving a text block.

It should be understood that the methods and apparatuses described above are only exemplary and do not limit the scope of the invention, and that various modifications could be made by those skilled in the art that would fall under the scope of the invention. For example, while 3 methods for limiting hyperlink movement, copying and deletion have been described above, clearly, any other type of limiting method is intended to be covered by the present invention. For example, instead of destroying hyperlinks prior to importing a text block into a document, the text block may first be imported into the document and thereafter the links may be destroyed. In addition, after links are destroyed, the processor need not recreate hyperlinks between hyperlink phrases in a text block which has been moved and corresponding objects. In addition, while a preferred embodiment of the invention employs all the methods described above for identifying hyperlinks in a text block to be moved, copied or deleted, identifying hyperlinks which may be destroyed by deletion or moving of a text block and identifying hyperlinks which may be created by moving or copying a text block, clearly, the invention is meant to cover embodiments having either one or two of the methods described above.

To apprise the public of the scope of this invention, I make the following claims:

1. A method for use with a computer having a word processor capable of allowing access to at least first and second separate word processor documents, displaying at least one of the first and second word processor documents on a screen for viewing, facilitating text block importation including both copying and moving of text blocks between the first and second documents and also facilitating formation of hyperlinks between hyperlink phrases within a displayed document and other electronically stored hyperlink information identified by hyperlink addresses, a block to be imported being an import block, the method for limiting text block importation when an import block includes hyperlink text, the method comprising the steps of:

monitoring word processor commands;

identifying text block importation commands wherein an import block includes at least one hyperlink phrase; and when an import block includes at least one hyperlink phrase, limiting the import block importation, wherein the step of limiting includes prohibiting import block importation.

2. A method for use with a computer having a word processor capable of allowing access to at least first and second separate word processor documents, displaying at least one of the first and second word processor documents on a screen for viewing, facilitating text block importation including both copying and moving of text blocks between the first and second documents and also facilitating formation of hyperlinks between hyperlink phrases within a displayed document and other electronically stored hyperlink information identified by hyperlink addresses, a block to be imported being an import block, the method for limiting text block importation when an import block includes hyperlink text, the method comprising the steps of:

monitoring word processor commands;

identifying text block importation commands wherein an import block includes at least one hyperlink phrase; and when an import block includes at least one hyperlink phrase, limiting the import block importation;

wherein the text block command generator is an operator and the step of limiting includes the steps of indicating to the operator that an import block includes at least one hyperlink phrase, allowing the operator to affirmatively acknowledge that the import block including the hyperlink phrase should be imported and, if the operator chooses to import the import block, completing the import block importation.

3. The method of claim 2 wherein the step of indicate to includes the step of providing the operator with the choice of (1) allowing the import block importation to occur with hyperlinks intact or (2) destroying hyperlinks between any import block hyperlink phrase and hyperlink information and allowing the import block importation to occur.

4. A method for use with a computer having a word processor capable of allowing access to at least first and second separate word processor documents, displaying at least one of the first and second word processor documents on a screen for viewing, facilitating text block importation including both copying and moving of text blocks between the first and second documents and also facilitating formation of hyperlinks between hyperlink phrases within a displayed document and other electronically stored hyperlink information identified by hyperlink addresses, a block to be imported being an import block, the method for limiting text block importation when an import block includes hyperlink text, the method comprising the steps of:

monitoring word processor commands;

identifying text block importation commands wherein an import block includes at least one hyperlink phrase; and when an import block includes at least one hyperlink phrase, limiting the import block importation;

wherein the first document is related to a first topic and the second document is related to a second topic, each separately accessible segment of hyperlink information is a hyperlink object and there are first and second hyperlink object sets including specific hyperlink objects, the subject matter of the first and second sets corresponding to the first and second topics, respectively, each hyperlink object associated with a designating hyperlink phrase, the document to which the import block is to be provided being a receiving document, the step of limiting further including:

destroying hyperlinks while leaving hyperlink phrases intact in the import block;

identifying a receiving document object set; and for each object in the receiving document object set:
(i) identifying a designating hyperlink phrase;
(ii) identifying each instance of the designating phrase which occurs in the import block; and
(iii) establishing a separate hyperlink for each designating phrase instance with an object from the import document object set generating a modified import block.

5. The method of claim 4 further including the step of importing the modified import block into the receiving document.

6. The method of claim 4 further including the step of, prior to destroying, importing the import block into the receiving document.

7. A method for use with a computer having a word processor capable of allowing access to at least first and second separate word processor documents, displaying at least one of the first and second word processor documents on a screen for viewing, wherein the first document is related to a first topic and the second document is related to a second topic, facilitating text block importation including both copying and moving of text blocks between the first and second documents and also facilitating formation of hyperlinks between hyperlink phrases within a displayed document and other electronically stored hyperlink information identified by hyperlink addresses, a block to be imported being an import block, each separately accessible segment of hyperlink information is a hyperlink object and there are first and second hyperlink object sets including specific hyperlink objects, the subject matter of the first and second sets corresponding to the first and second topics, respectively, each hyperlink object associated with a designating hyperlink phrase, the document to which the import block is to be provided being a receiving document, the text used to designate objects in the first set is identical to the text used to designate objects in the second set, the method for limiting text block importation when an import block includes hyperlink text, the method comprising the steps of:

monitoring word processor commands;

identifying text block importation commands wherein an import block includes at least one hyperlink phrase; and when an import block includes at least one hyperlink phrase;

storing a record of the import block hyperlink phrases destroying hyperlinks while leaving hyperlink phrases intact in the import block;

identifying a receiving document object set; and for each object in the receiving document object set:
(i) accessing the stored import block hyperlink phrases;
(ii) identifying each instance of the designating phrase which occurs in the import block; and
(iii) establishing a separate hyperlink for each designating phrase instance with an object from the import document object set generating a modified import block.

8. The method of claim 7 wherein each designating hyperlink phrase includes at least X and no more than Y separate terms and the step of identifying each instance of the designating phrase includes the steps of:

for each designating hyperlink phrase, comparing the designating hyperlink phrase to every consecutive text segment in the import block having a length of between X and Y terms and, when the designating hyperlink phrase matches the text segment, identifying the text segment as an instance of the designating phrase.

9. A method for use with a computer having a word processor capable of allowing access to at least first and second separate word processor documents, displaying at least one of the first and second word processor documents on a screen for viewing, facilitating text block importation including both copying and moving of text blocks between the first and second documents and also facilitating formation of hyperlinks between hyperlink phrases within a displayed document and other electronically stored hyperlink information identified by hyperlink addresses, a block to be imported being an import block, the method for limiting text block importation when an import block includes hyperlink text, the method comprising the steps of:

monitoring word processor commands;

identifying text block importation commands wherein an import block includes at least one hyperlink phrase; and when an import block includes at least one hyperlink phrase, limiting the import block importation;

wherein the first document is related to a first topic and the second document is related to a second topic, each separately accessible segment of hyperlink information is a hyperlink object and there are first and second hyperlink object sets including specific hyperlink objects, the subject matter of the first and second sets corresponding to the first and second topics, respectively, each hyperlink object associated with a designating hyperlink phrase, the document to which the import block is to be provided being a receiving document, the step of limiting further including:

allowing the import block to be imported into the receiving document;

destroying all hyperlinks in the receiving document while leaving hyperlink phrases intact throughout the receiving document;

identifying a receiving document object set; and for each object in the receiving document object set:
(i) identifying a designating hyperlink phrase;
(ii) identifying each instance of the designating phrase which occurs in the receiving document; and
(iii) establishing a separate hyperlink for each designating phrase instance with an object from the import document object set.

10. A method for use with a computer having a word processor capable of allowing access to at least first and second separate word processor documents, displaying at least one of the first and second word processor documents on a screen for viewing, facilitating text block importation including both copying and moving of text blocks between the first and second documents and also facilitating formation of hyperlinks between hyperlink phrases within a displayed document and other electronically stored hyperlink information identified by hyperlink addresses, a block to be imported being an import block, the method for limiting text block importation when an import block includes hyperlink text, the method comprising the steps of:

monitoring word processor commands;

identifying text block importation commands wherein an import block includes at least one hyperlink phrase; and when an import block includes at least one hyperlink phrase, limiting the import block importation;

wherein the step of limiting includes adding an identifier to each hyperlink phrase instance in the import block and allowing the import block to be imported.

11. A method for use with a computer having a word processor capable of allowing access to at least first and second separate word processor documents, displaying at least one of the first and second word processor documents on a screen for viewing, facilitating text block importation including both copying and moving of text blocks between the first and second documents and also facilitating formation of hyperlinks between hyperlink phrases within a displayed document and other electronically stored hyperlink information identified by hyperlink addresses, a block to be imported being an import block, the method for limiting text block importation when an import block includes hyperlink text, the method comprising the steps of:

monitoring word processor commands;

identifying text block importation commands wherein an import block includes at least one hyperlink phrase; and when an import block includes at least one hyperlink phrase, limiting the import block importation;

wherein some hyperlink phrases are document dependent and other hyperlink phrases are not document dependent and the step of identifying text block importation commands wherein an import block includes hyperlink text includes the steps of:

determining if any one of the hyperlink phrases are document dependent; and where any of the hyperlink phrases is document dependent, identifying the command as a command including hyperlink text and, where none of the phrases are hyperlink dependent, allowing importation of the import block.

12. A method for use with a computer having a word processor capable of displaying a word processor document on a screen for viewing, facilitating text block edits including copying, moving and deleting of text blocks within the document and also facilitating formation of hyperlinks between hyperlink phrases within the document and other electronically stored hyperlink information identified by hyperlink addresses, a block to be edited being an edit block, the method for limiting text block edits when an edit block includes hyperlink phrase, the method comprising the steps of:

monitoring word processor commands;

identifying text block edit commands wherein an edit block includes at least one hyperlink phrase; and when an edit block includes at least one hyperlink phrase, limiting the text block edit, wherein the step of limiting includes prohibiting the text block edit.

13. A method for use with a computer having a word processor capable of displaying a word processor document on a screen for viewing, facilitating text block edits including copying, moving and deleting of text blocks within the document and also facilitating formation of hyperlinks between hyperlink phrases within the document and other electronically stored hyperlink information identified by hyperlink addresses, a block to be edited being an edit block, the method for limiting text block edits when an edit block includes hyperlink phrase, the method comprising the steps of:

monitoring word processor commands;

identifying text block edit commands wherein an edit block includes at least one hyperlink phrase; and when an edit block includes at least one hyperlink phrase, limiting the text block edit;

wherein the text block edit command generator is an operator and the step of limiting includes the steps of indicating to the operator that an edit block includes a hyperlink phrase, allowing the operator to affirmatively acknowledge that the edit block including a hyperlink phrase should be edited and, if the operator chooses to edit the edit block, completing the text block edit.

14. A method for use with a computer having a word processor capable of displaying a word processor document on a screen for viewing, facilitating text block edits including copying, moving and deleting of text blocks within the document and also facilitating formation of hyperlinks between hyperlink phrases within the document and other electronically stored hyperlink information identified by hyperlink addresses, a block to be edited being an edit block, the method for limiting text block edits when an edit block includes hyperlink phrase, the method comprising the steps of:

monitoring word processor commands;

identifying text block edit commands wherein an edit block includes at least one hyperlink phrase; and when an edit block includes at least one hyperlink phrase, limiting the text block edit;

wherein the step of indicating to includes the step of providing the operator with the choice of (1) allowing the text block edit to occur with hyperlinks intact or (2) destroying hyperlinks between any edit block hyperlink phrases and hyperlink information and allowing the text block edit to occur.

15. A method for use with a computer having a word processor capable of allowing access to at least first and second separate word processor documents, displaying at least one of the first and second word processor documents on a screen for viewing, facilitating text block modification including both copying and moving of text blocks between the first and second documents and within either of the first or second documents, a text block defined by first and last designated characters and text therebetween, a text block to be modified being a modify block, the word processor also facilitating formation of hyperlinks between hyperlink phrases within a displayed document and other electronically stored hyperlink information identified by hyperlink addresses, the method for limiting text block modifications when either the first or last modify block character or the first and last modify block characters fragment a hyperlink phrase, the method comprising the steps of:

monitoring word processor commands;

identifying text block modification commands wherein either the first or last modify block character or the first and last modify block characters fragment a hyperlink phrase; and when either the first or last modify block character or the first and last modify block characters fragment a hyperlink phrase, limiting the text block modification.

16. The method of claim 14 wherein the step of limiting includes prohibiting text block modification.

17. The method of claim 14 wherein the text block command generator is an operator and the step of limiting includes the steps of notifying the operator that a modify block fragments a hyperlink phrase, allowing the operator to affirmatively acknowledge that the modify block which fragments the hyperlink phrase should be modified and, if the operator chooses to modify the modify block, completing the block modification.

18. The method of claim 14 wherein each hyperlink phrase includes no more than X terms, each modify block has a designation point within a receiving document, the X terms within the receiving document which are directly before the designation point are proceeding terms, the X terms within the receiving document which are directly after the designation point are following terms, the first X terms in a modify block are first terms and the last X terms in a modify document are last terms and, wherein, the method is also for avoiding creation of unintended new hyperlink phrases or inadvertently destroying hyperlink phrases which exist in the receiving document, the method further including the steps of:

monitoring word processor commands;

identifying text block modification commands wherein a completed modification would either destroy an existing hyperlink phrase by splitting the proceeding and following terms or create a new hyperlink by combining either the proceeding and first terms or combining the last and following terms; and when a completed modification would either destroy an existing hyperlink phrase by splitting the proceeding and following terms or create a new hyperlink by combining either the proceeding and first terms or combining the last and following terms, limiting the text block modification.

19. A method for use with a computer having a word processor capable of allowing access to at least first and second separate word processor documents, displaying at least one of the first and second word processor documents on a screen for viewing, facilitating text block modification including both copying and moving of text blocks between the first and second documents and within either of the first or second documents, a document receiving text being a receiving document, a text block to be modified being a modify block, wherein each modify block has a designation point within a receiving document, the X terms within the receiving document which are directly before the designation point are proceeding terms, the X terms within the receiving document which are directly after the designation point are following terms, the first X terms in a modify block are first terms and the last X terms in a modify document are last terms, the word processor also facilitating formation of hyperlinks between hyperlink phrases within a displayed document and other electronically stored hyperlink information identified by hyperlink addresses, the method for avoiding creation of unintended new hyperlink phrases or inadvertently destroying hyperlink phrases which exist in the receiving document, the method further including the steps of:

monitoring word processor commands;

identifying text block modification commands wherein a completed modification would either destroy an existing hyperlink phrase by splitting the proceeding and following terms or create a new hyperlink by combining either the proceeding and first terms or combining the last and following terms; and when a completed modification would either destroy an existing hyperlink phrase by splitting the proceeding and following terms or create a new hyperlink by combining either the proceeding and first terms or combining the last and following terms, limiting the text block modification.

20. The method of claim 17 wherein the step of limiting includes prohibiting text block modification.

21. The method of claim 17 wherein the text block command generator is an operator and the step of limiting includes the steps of notifying the operator that a modify block fragments a hyperlink phrase, allowing the operator to affirmatively acknowledge that the modify block which fragments the hyperlink phrase should be modified and, if the operator chooses to modify the modify block, completing the block modification.

* * * * *